3,144,483
α-CHLORINATION OF DIVALENT SULFUR
COMPOUNDS
Roy B. Flay, Concord, Calif., assignor to California Research Corporation, San Francisco, Calif., a corporation of Delaware
No Drawing. Filed Sept. 12, 1960, Ser. No. 55,109
7 Claims. (Cl. 260—543)

The present invention relates to a process for α-chlorination of divalent sulfur compounds, i.e., substituting a chlorine atom on a carbon atom adjacent to a divalent sulfur. More particularly, the invention provides a process for α-chlorinating certain divalent sulfur compounds in the presence of a catalytic amount of concentrated sulfuric acid.

In the past it has been extremely difficult, if not impossible, to make certain potentially valuable agricultural fungicides by reason of the difficulty encountered in chlorinating certain organic divalent sulfur compounds at a carbon atom adjacent to a sulfur atom, i.e., an α-carbon atom. For example, the compound 1,2,2,2-tetrachloroethylsulfenyl chloride may be easily prepared by reacting a bis-1,2,2,2-tetrachloroethyl disulfide with a chlorine in a known manner. However, attempts to substitute a second chlorine atom on the α-carbon atom of the ethyl group of this sulfenyl chloride have been unsuccessful. When carried out according to methods known in the art, employing well-known chlorination catalysts such as anhydrous aluminum or ferric chloride with or without the presence of ultraviolet light, peroxides, or iodine, at temperatures up to about 50° C., no α-chlorination occurred. Perhaps at higher temperatures some α-chlorination could be induced, but not without the concomitant and undesirable consequences of rearrangement and/or decomposition of the desired product.

It has now been discovered that these previously impossible or impractical α-chlorination reactions may be successfully carried out at low temperatures to obtain almost quantitative α-chlorination by contacting the described compounds with chlorine in the presence of a sulfuric acid catalyst.

The process of the invention comprises contacting the desired divalent sulfur compound with chlorine at a temperature between about −20° C. and +50° C., preferably about −10° to +10° C., in the presence of an amount of sulfuric acid equal to about 0.10 to 5.0 percent, preferably 0.25 to 1.0 percent, based on the weight of the sulfur compound used. Sulfuric acid is employed in concentrations varying from about 70 to 100 weight percent, preferably 95 to 98 weight percent.

Suitable α-chlorinatable starting materials within the scope of the invention have the formula

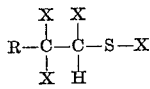

wherein R is an organic radical, preferably alkyl, aryl, aralkyl, alkaryl, or substituted members thereof, or is hydrogen or halogen, and X is halogen. Precursors of these compounds, such as disulfides or thiols, which form the sulfenyl chloride on chlorination under the conditions employed, are also suitable. It is noted, however, that any organic radical above disclosed must be one which is unreactive with the catalyst at the reaction conditions herein employed. Preferred starting materials include bis-1,2,2,2-tetrachloroethyl disulfide, 1,2,2,2-tetrachloroethylsulfenyl chloride, bis-1,2,2-trichloroethyl disulfide, and 1,2,2-trichloroethylsulfenyl chloride.

The process of the invention is carried out by contacting the desired divalent sulfur compound admixed with a suitable inert solvent, e.g., carbon tetrachloride, if desired, with approximately stoichiometric amounts of chlorine gas in the presence of the required quantities of catalyst, i.e., 0.10 to 5.0 percent based on weight of the sulfur compound of sulfuric acid of 70 to 100 weight percent concentration. An excess or less than stoichiometric amounts of chlorine may be used without unduly harming the reaction. The temperature is controlled at the desired level by cooling in an ice bath while the gaseous chlorine is slowly bubbled in so as to control the rate of formation of gaseous hydrogen chloride evolved. After completion of chlorine addition, the reaction is quenched with ice water and the sulfuric acid removed by water extraction. The solvent is then stripped at about 40° C. and 20 mm. pressure. Where the product is a liquid at normal temperature and pressure, it is removed from the mixture by fractionation, preferably at reduced pressure. Where it is a solid, the mixture is chilled to allow the solid to crystallize, whereupon, if desired, it is washed with a suitable solvent, such as methanol.

Prior to this invention, there was believed to be no practical way to obtain certain useful chemical intermediates such as 1,1,2,2-tetrachloroethylsulfenyl chloride and perchloroethylsulfenyl chloride. Also, many other useful intermediates and compositions may be prepared easily and in nearly quantitative yields by employing the unique catalytic chlorination process of the invention.

The process of the invention is more clearly illustrated by reference to the following examples. It is to be observed that these examples are included merely by way of illustration and are not to be construed as further limitations on the scope of the invention.

*Example 1*

Five separate mixtures of 200 g. 1,2,2-trichloroethylsulfenyl chloride and 200 ml. carbon tetrachloride, each having 2 g. of one of the following catalysts, were prepared:

(1) Anhydrous aluminum trichloride
(2) Anhydrous ferric chloride
(3) Benzoyl peroxide
(4) Anhydrous ferric chloride in the presence of ultraviolet light
(5) Iodine.

To each mixture, 71 g. of chlorine were slowly added over a period of about one-half hour while the mixture was continuously agitated and maintained at about 0°–5° C. by means of an ice bath. In all of the above cases, essentially no α-chlorination occurred, as shown by far infrared spectra.

*Example 2*

A mixture of 200 g. 1,2,2-trichloroethylsulfenyl chloride, 200 ml. carbon tetrachloride, and 2 g. 98 percent sulfuric acid was prepared as in Example 1 except for the addition of the catalyst. 71 g. chlorine were slowly added over a period of about one-half hour while the mixture was continuously agitated and maintained at about 0°–5° C. by means of an ice bath. The reaction was then quenched with ice water and the remaining sulfuric acid removed by water extraction. The solvent was stripped at about 40° C. and 20 mm. pressure. A fraction boiling at 45–50° C. at 0.1 mm. pressure was removed by distillation and analyzed to be an essentially quantitative yield of 1,1,2,2-tetrachloroethylsulfenyl chloride. The analysis of 1,1,2,2-tetrachloroethylsulfenyl chloride is as follows:

|  | Theory | Found |
| --- | --- | --- |
| Percent chlorine | 75.6 | 72 |
| Percent sulfur | 13.6 | 13.8 |

When the concentration of sulfuric acid was reduced to 96 percent, the reaction still occurred, but more slowly than with 98 percent acid.

Reduction of the acid concentration to 90 percent resulted in only a partial conversion.

Further reduction in concentration of acid to 75 percent caused the reaction to proceed extremely slowly. When the temperature was raised above the preferred level to about 50° C., thereby undesirably causing decomposition and/or rearrangement of the product, a partial yield was obtained of the desired 1,1,2,2-tetrachloroethylsulfenyl chloride.

*Example 3*

A mixture of 200 g. 1,2,2,2-tetrachloroethylsulfenyl chloride, 200 ml. carbon tetrachloride, and 2 g. 98 percent sulfuric acid was prepared. 71 g. chlorine were slowly added over a period of about one-half hour while the mixture was continuously agitated and maintained at about 0°–5° C. by means of an ice bath. The reaction was then quenched with ice water and the sulfuric acid removed by extraction. The solvent was stripped at about 40° C. and 20 mm. pressure. Upon chilling, a solid crystallized which was washed with methanol and found to melt at about 73°–75° C. and analyzed to be an essentially quantitative yield of perchloroethylsulfenyl chloride.

|  | Theory | Found |
| --- | --- | --- |
| Percent chlorine | 79.2 | 78.8 |
| Percent sulfur | 11.9 | 12.0 |

*Example 4*

A mixture of 199 g. bis-1,2,2,2-tetrachloroethyl disulfide, 200 ml. carbon tetrachloride solvent, and 2 g. 98 percent by weight sulfuric acid was cooled to about 0°–5° C. and maintained there by means of an ice-water bath while 106.5 g. chlorine were bubbled slowly into the mixture so as to avoid unduly rapid formation of hydrogen chloride gas. After the addition of chlorine was completed, the reaction was quenched with ice water and any sulfuric acid remaining was removed by water extraction. Solvent was removed by distillation at 40° C. and 20 mm. pressure, and the remaining product was chilled, whereupon a yellow solid crystallized which was analyzed to be perchloroethylsulfenyl chloride.

The foregoing examples should not be considered as limitations on the scope of the invention. As will be evident to those skilled in the art, various modifications in the process can be made or followed, in the light of the foregoing disclosure, without departing from the spirit or scope of the invention or from the scope of the following claims.

I claim:

1. A method of α-chlorinating a divalent sulfur compound of the formula

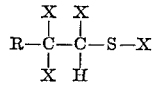

wherein R is selected from the class consisting of hydrogen and halogen, and X is halogen, which comprises contacting said sulfur compound with chlorine at a temperature of about −20° C. to +50° C. in the presence of sulfuric acid of about 0.10 to 5.0 percent by weight sulfur compound, said sulfuric acid being in concentrations from about 70 to 100 weight percent.

2. A method of claim 1 wherein the temperature is between −10° and +10° C.

3. A method of claim 1 wherein said sulfuric acid is from 95 to 98 weight percent concentration.

4. A method of claim 3 wherein the temperature is between −10° and +10° C.

5. A method of α-chlorinating a sulfur compound of the formula

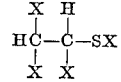

wherein X is halogen, which comprises contacting the sulfur compound with chlorine at a temperature of about −20° C. to +50° C. in the presence of sulfuric acid of about 0.10 to 5.0% by weight sulfur compound, said sulfuric acid being in concentrations from about 70 to 100 weight percent.

6. A method of α-chlorinating a sulfur compound of the formula

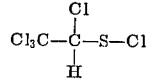

which comprises contacting the sulfur compound with chlorine at a temperature of about −20° C. to +50° C. in the presence of sulfuric acid of about 0.10 to 5.0 percent by weight sulfur compound, said sulfuric acid being in concentrations from about 70 to 100 weight percent.

7. A method of α-chlorinating a divalent sulfur compound of the formula

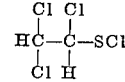

which comprises contacting said sulfur compound with chlorine at a temperature of about −20° C. to +50° C. in the presence of sulfuric acid of about 0.10 to 5.0% by weight sulfur compound, said sulfuric acid being in concentrations from about 70 to 100 weight percent.

No references cited.